United States Patent
Everson et al.

(10) Patent No.: US 6,885,298 B2
(45) Date of Patent: Apr. 26, 2005

(54) FUEL CELL SYSTEM WITH A DETECTION SYSTEM FOR FIRE OR ELEVATED TEMPERATURES

(75) Inventors: Ted Everson, Santa Barbara, CA (US); Adrian Corless, New Westminster (CA); Edward Mufford, Langley (CA)

(73) Assignee: Ballard Power Systems AG, Kirchheim-Nabern (DE)

( * ) Notice: Subject to any disclaimer, the term of this patent is extended or adjusted under 35 U.S.C. 154(b) by 428 days.

(21) Appl. No.: 10/015,937

(22) Filed: Dec. 17, 2001

(65) Prior Publication Data

US 2003/0112140 A1 Jun. 19, 2003

(51) Int. Cl.[7] .............................................. G08B 19/00
(52) U.S. Cl. ...................... 340/521; 340/581; 340/577; 340/628
(58) Field of Search ................................ 340/521, 581, 340/577, 628; 429/22, 23, 24, 26

(56) References Cited

U.S. PATENT DOCUMENTS

| | | | | |
|---|---|---|---|---|
| 4,930,134 A | * | 5/1990 | Macaione et al. | ............ 372/33 |
| 5,085,949 A | * | 2/1992 | Sanderson et al. | ............ 429/23 |
| 5,412,374 A | * | 5/1995 | Clinton | ...................... 340/584 |
| 5,579,736 A | * | 12/1996 | Nakamura et al. | ...... 123/339.11 |
| 5,748,429 A | * | 5/1998 | Peterson | ...................... 361/106 |
| 6,093,500 A | * | 7/2000 | Margiott et al. | ............... 429/13 |
| 6,495,113 B1 | * | 12/2002 | Aoyama | ...................... 423/247 |

FOREIGN PATENT DOCUMENTS

EP           0 011 461        5/1980

* cited by examiner

*Primary Examiner*—Anh V. La
(74) *Attorney, Agent, or Firm*—Seed IP Law Group PLLC

(57) ABSTRACT

A fuel cell system includes a fuel cell stack with single fuel cells stacked together in a fuel cell housing and a detection system for fire or elevated temperatures. The detection system may include a monitoring system; a sensor unit that detects fire or elevated temperatures inside said fuel cell housing; and a voltage or current source.

26 Claims, 4 Drawing Sheets

FUEL CELL SYSTEM WITH A DETECTION SYSTEM FOR FIRE OR ELEVATED TEMPERATURES

BACKGROUND AND SUMMARY OF THE INVENTION

The present invention relates to a fuel cell system and a method for operating the same.

In a fuel cell system, electrical energy is typically generated through a chemical reaction of a gas containing hydrogen and a gas containing oxygen. The hydrogenous gas can be obtained, for example, by the reforming of petroleum or methanol. The fuel cell system may be used to power a vehicle. System failure or an accident may cause the hydrogenous gas to react with the gas containing oxygen in an uncontrolled manner, i.e. the hydrogenous gas may explode with the gas containing oxygen. This may lead to a fire or elevated temperature conditions causing system damage and, especially in a vehicle, passenger damage.

An object of preferred embodiments according to the present invention is to ensure safe operation of a fuel cell system especially in a vehicle.

The present invention allows detection and monitoring of a fire or elevated temperatures inside the fuel cell housing that contains the fuel cell stack which might be critical for fuel cell operation. A fire or elevated temperatures might be caused by system failure or accident. If a fire or elevated temperatures are detected, corresponding action can be taken to avoid passenger and/or system damage and/or to maintain system operation. Hence, the present invention leads to improved safety.

Further, the present invention comprises a sensor for the detection of fire or elevated temperatures. The sensor is economically priced and straightforwardly constructed and produced.

Other objects, advantages and novel features of the present invention will become apparent from the following detailed description of the present invention when considered in conjunction with the accompanying drawings.

DETAILED DESCRIPTION OF THE DRAWINGS

The present invention can be used in vehicles where a fuel cell system supplies electric power, but is not restricted to automotive applications.

Figure 1:
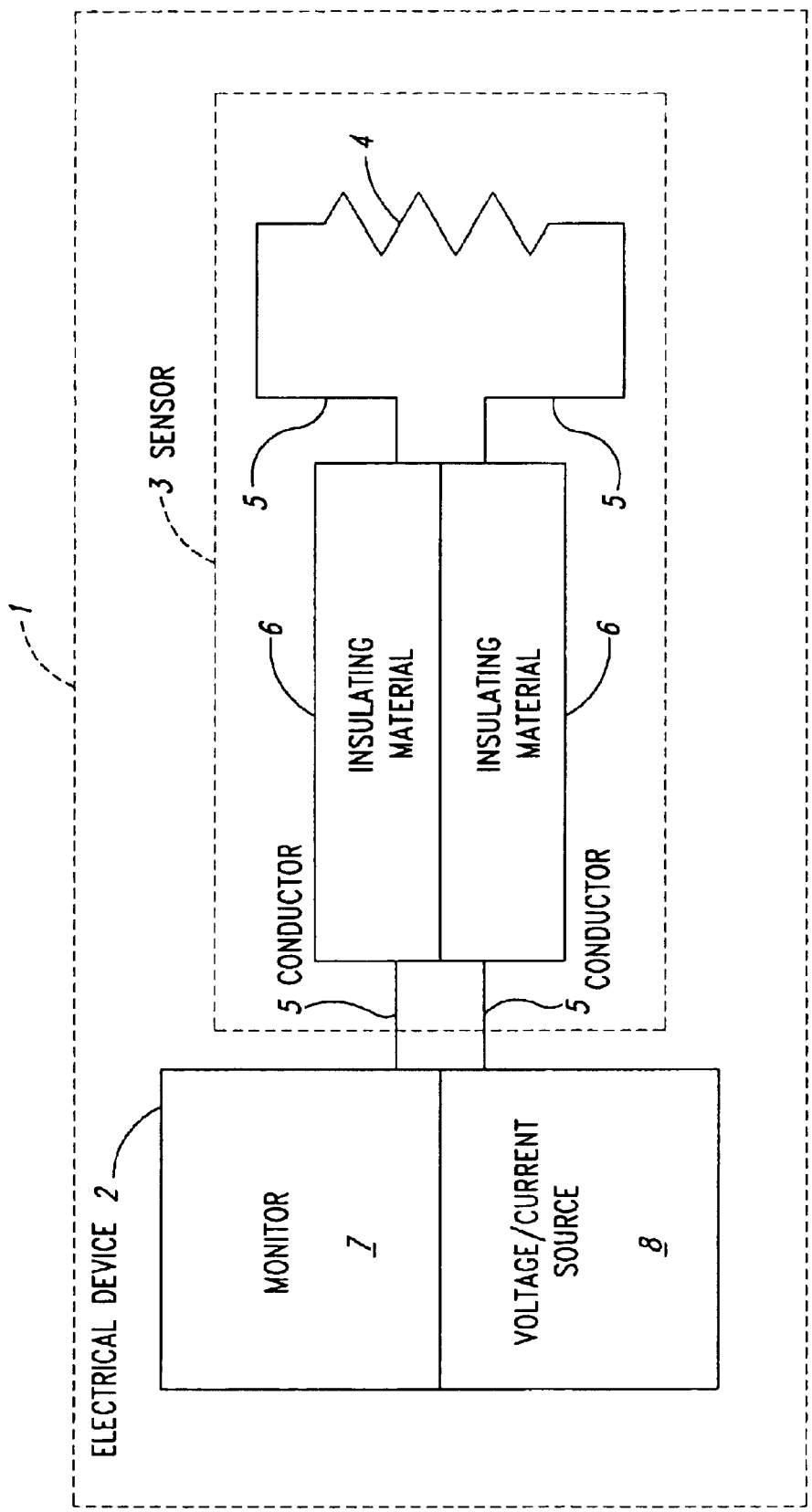
FIG. 1 shows a schematic sketch of an embodiment of a detection system for fire and elevated temperatures according to the present invention.

FIG. 1 shows a schematic view of a detection system for fire and elevated temperatures according to the present invention. A fuel cell system comprises a fuel cell stack with single fuel cells stacked together in a fuel cell housing. A detection system 1 for fire or elevated temperatures is assigned to the fuel cell stack.

Figure 2A:
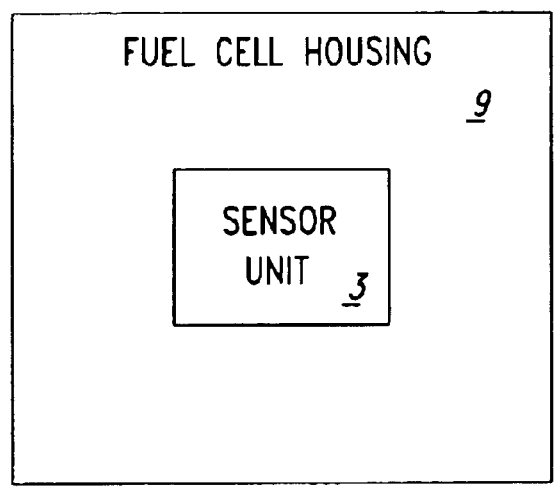
FIG. 2a shows a schematic sketch of a sensor arrangement in which a sensor unit is located inside a fuel cell housing.
Figure 2B:
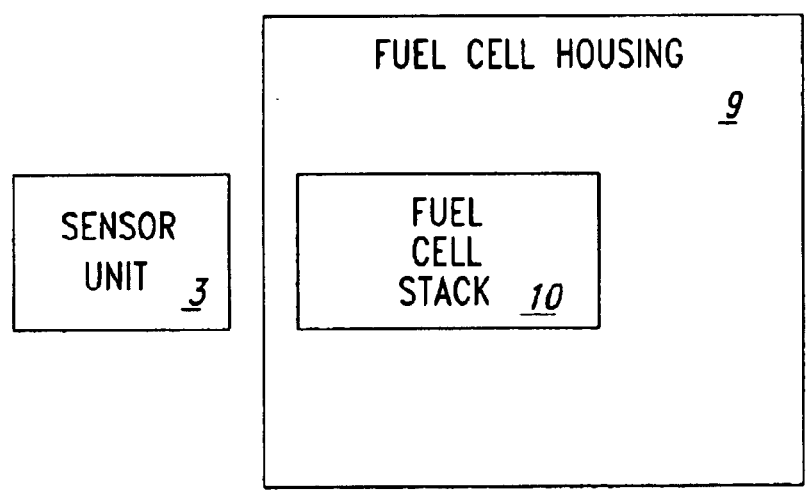
FIG. 2b shows a schematic sketch of a sensor arrangement in which a sensor unit is juxtaposed to the fuel cell stack.

The detection system 1 comprises a monitoring system 7; a sensor unit 3 for detecting fire or elevated temperatures critical for fuel cell operation; and a voltage or current source 8. The monitoring system 7 and the voltage or current source 8 are advantageously integrated in one electrical device 2. However, they can also form separate devices. The sensor unit 3 may be located inside the fuel cell housing 9 and/or juxtaposed to the fuel cell stack 10, as shown in FIGS. 2a and 2b.

The sensor unit 3 may comprise a pair of electric conductors 5 and electrical loop-forming means 4. The electrical loop-forming means 4 is preferably a resistor. One end of the pair of conductors 5 is connected to the electrical loop-forming means 4 and the other end of the pair of conductors 5 is connected to the electrical device 2 containing the monitoring system and the voltage or current source. Alternatively, the monitoring system can be connected to the former end of the pair of electric conductors 5.

Alternatively, the loop-forming means 4 can be part of the electrical device 2 whereby both ends of the pair of conductors 5 are connected to the monitoring system integrated in the electrical device 2 and the pair of electric conductors 5 forms a loop inside the fuel cell housing and/or juxtaposed to the fuel cell stack. The pair of electric conductors preferably forms a loop through the fuel cell stack or area of potential fire concern.

Such sensor units are known. For example, EP 0 011 461 describes a detection system for fire or elevated temperatures in a plurality of discrete zones where the system comprises a pair of electric conductors passing through each of the discrete zones. The pair of conductors is sectionalized into a plurality of discrete linear sensor units connected in series. Each linear sensor unit comprises a pair of electric conductors which are electrically insulated from one another by an electrically insulating material that will melt under the temperature conditions to be detected.

The electric conductors 5 are electrically insulated from one another at least partly by meltable, electrically-insulating material 6 that melts under elevated temperatures that are critical for fuel cell operation. For example, if the operating temperature of the fuel cell stack is 80° C., temperatures critical for fuel cell operation would approximately lie above 100° C. The lowest temperature when fuel cell operation becomes critical is also called a critical temperature.

The melting material is preferably plastic. The melting point of the insulating material depends on the composition of the insulating material and is therefore adjustable. Further, the pair of electric conductors 5 is arranged in such a way that, when the insulating material 6 melts at any position, one or each of the electric conductors will move into electric contact with the other conductor causing a short circuit, and an alarm signal is generated. The electrical resistance of the electrical contact at the short circuit between the two conductors will be substantially zero causing a current increase which can be identified as alarm signal for system failure by the monitoring system.

One of the advantages of using such sensor units is their ability to cover more area inside a confined apparatus than single point detectors (e.g., spot detectors). Further, such sensor units do not have to rely on line of sight. Such sensor units are comparatively inexpensive.

Figure 3:
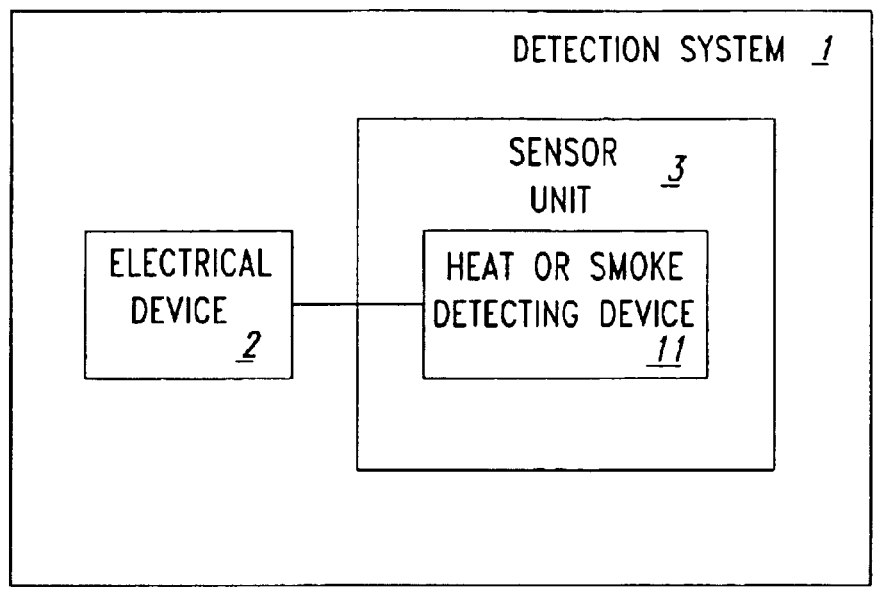
FIG. 3 shows a schematic sketch of a detection system according to another embodiment of the present invention.

Alternatively, as shown in FIG. 3, the sensor unit 3 can comprise a device 11 for detecting signals emitted by a heat source, e.g. a fire or smoke. The device may be a pyrometer, a thermograph, an infrared detector and/or an ultraviolet detector, which is also referred to as flame detector.

Figure 4:
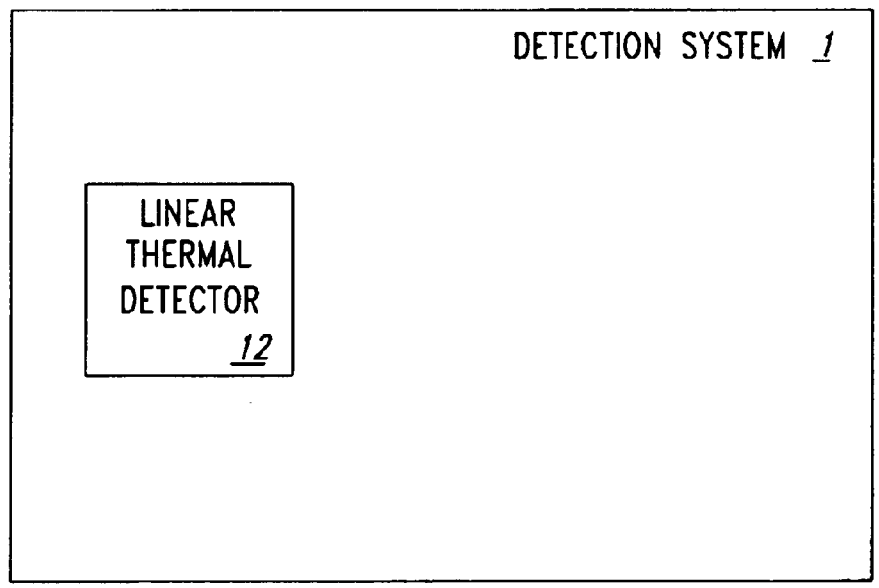
FIG. 4 shows a schematic sketch of a detection system according to another embodiment of the present invention.

Alternatively, the detection system 1 can comprise a linear thermal detector 12 that utilizes gas expansion, as shown in FIG. 4.

Figure 5:
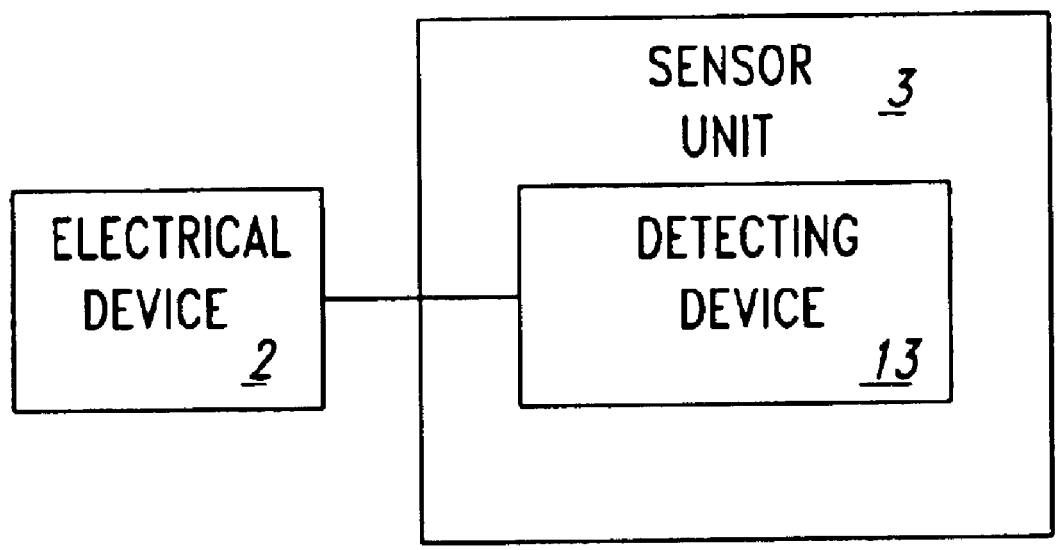
FIG. 5 shows a schematic sketch of a detection system according to another embodiment of the present invention.

In another embodiment according to the present invention, as shown in FIG. 5, sensor unit 3 comprises at least one device 13 selected from the group consisting of quartz thermometer, a thermocouple, a bimetallic snap disc, an IC temperature sensor and/or an electrical device that generates a temperature-sensing output voltage and/or a temperature sensing output current. A quartz thermometer consists of a quartz crystal whose resonant frequency changes with temperature. A thermocouple exploits a junction between two dissimilar metals, which generates a small voltage, typically in the millivolt range. A bimetallic snap disc consists typically of two different metals with different thermic behavior bonded together. The bimetallic snap disc is usually used as spot detector. IC temperature sensors are semiconductor devices whose bandgap voltage reference can be used to generate a temperature-sensing output voltage proportional to absolute temperature. Another approach to IC temperature sensors acts as a constant-current element, passing a current in microamps equal to the absolute temperature.

In another embodiment according to the present invention, the sensor unit 3 which comprises an impedance 4 that exhibits a negative or positive coefficient of resistance with temperature. Impedance is a generic term covering the resistance of resistors and the reactance of capacitors and inductors. Such an impedance could be represented by a thermistor and/or a platinum resistance thermometer. Thermistors are semiconductor devices that exhibit a negative coefficient of resistance with temperature. Platinum resistance thermometers consist simply of a coil of very pure platinum wire which has a positive temperature coefficient.

If the sensor unit 3 comprises an impedance and/or resistance 4 and this impedance and/or resistance 4 changes, preferably rapidly by at least one order of magnitude according to a temperature rise inside the fuel cell housing above the critical temperature, an alarm signal in form of an output voltage or an output current is generated by the sensor unit 3 and measured by the monitoring system.

A method for operating the detection system for fire or elevated temperatures inside a fuel cell housing is described as follows. A fire or elevated temperature inside the fuel cell housing that is critical for fuel cell operation is detected by the sensor unit 3, which is sensitive to elevated temperatures above the critical temperature and/or light emitted by the heat and/or fire source and/or smoke which is caused by the heat and/or fire source. In case of a fire or elevated temperatures above the critical temperature, the sensor unit 3 which is located inside the fuel cell housing generates an alarm signal and operation of the fuel cell stack is switched to a secure state. The alarm signal generated by the sensor unit 3 is sent to and detected by the monitoring system and the monitoring system indicates the fire or elevated temperatures preferably audibly or visually. The alarm signal is preferably in form of a voltage or a current signal and the monitoring system contains means to detect the alarm signal.

If an alarm signal is generated operation of the fuel cell stack is switched to secure state, preferably by disrupting or pausing the supply of a medium containing hydrogen to the fuel cell stack. Another option would be to shut down the entire fuel cell system in case of an alarm.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A fuel cell system comprising:
   fuel cell housing;
   a fuel cell stack with single fuel cells stacked together inside the fuel cell housing, and
   a fire or temperature detection system comprising, a monitoring system, a sensor unit that detects fire or elevated temperatures, wherein said sensor unit is located inside the fuel cell housing or is located outside of the fuel cell housing and juxtaposed to the fuel cell stack, and a voltage or current source.

2. A fuel cell system according to claim 1, wherein said sensor unit comprises a device for detecting signals emitted by a heat source.

3. A fuel cell system according to claim 1, wherein said detection system further comprises an impedance.

4. A fuel cell system according to claim 3, wherein said impedance exhibits a negative or positive coefficient of resistance with temperature.

5. A fuel cell system according to claim 4, wherein said impedance is at least one of a thermistor and a platinum resistance thermometer.

6. A fuel cell system according to claim 1, wherein said detection system further comprises a loop-forming means and said sensor unit comprises a pair of electric conductors.

7. A fuel cell system according to claim 6, wherein one end of said pair of conductors is connected to the electrical loop-forming means and the other end of said pair of conductors is connected to the voltage or current source.

8. A fuel cell system according to claim 6, wherein said electric conductors are electrically insulated from one another at least partly by a meltable electrically-insulating material that melts at elevated temperatures.

9. A fuel cell system according to claim 6, wherein said electrical loop-forming means is a resistor.

10. A fuel cell system according to claim 6, wherein an end of said pair of electric conductors is connected to the monitoring system.

11. A fuel cell system according to claim 8, wherein said pair of electric conductors is arranged such that, when said insulating material melts at any position, one electric conductor is moveable into electric contact with the other conductor.

12. A fuel cell system according to claim 1, wherein said sensor unit comprises at least one device selected form the group consisting of a pyrometer, a thermograph, an infrared detector, an ultraviolet detector, a linear thermal detector that utilizes gas expansion, and combinations thereof.

13. A fuel cell system according to claim 1, wherein said sensor unit comprises a quartz thermometer.

14. A fuel cell system according to claim 1, wherein said sensor unit comprises a device that generates at least one of a temperature-sensing output voltage and a temperature sensing output current.

15. A fuel cell system according to claim 1, wherein said sensor unit comprises a device selected from the group consisting of a thermocouple, a bimetallic snap disc, an IC temperature sensor, and combinations thereof.

16. A fuel cell system according to claim 1, wherein said detection system further comprises a linear thermal detector that utilizes gas expansion.

17. A method for detecting fire or elevated temperatures in a fuel cell stack in a fuel cell housing, said method comprising:

generating an alarm signal via a sensor unit sensitive to at least one of elevated temperatures, light, or smoke in case of a fire or elevated temperatures inside said fuel cell housing, wherein said sensor unit is located inside the fuel cell housing; and switching operation of the fuel cell stack to a secure state.

18. A method according to claim 17, wherein a monitoring system indicates said fire or elevated temperatures if the sensor unit generates an alarm signal.

19. A method according to claim 17, wherein said switching comprises disrupting or pausing a supply of a medium containing hydrogen to said fuel cell stack if said sensor unit generates an alarm signal.

20. A method according to claim 17, wherein said switching comprises shutting down the fuel cell system if said sensor unit generates an alarm signal.

21. A method according to claim 17, wherein an impedance of said sensor unit changes rapidly by at least one order of magnitude if the temperature inside the fuel cell housing rises above a temperature critical for fuel cell operation.

22. A method according to claim 21, wherein the impedance of said sensor unit rises rapidly by at least one order of magnitude if the temperature inside the fuel cell housing rises above a temperature critical for fuel cell operation.

23. A method according to claim 21, that the impedance of said sensor unit drops rapidly by at least one order of magnitude if the temperature inside the fuel cell housing rises above a temperature critical for fuel cell operation.

24. A method according to claim 17, wherein a temperature rise inside the fuel cell housing above elevated temperatures which are critical for fuel cell operation cause melting of insulating material separating a pair of electric conductors from one another.

25. A method according to claim 24, wherein upon melting of said insulating material, one or each of the electric conductors moves into electric contact with the other conductor and an alarm signal is generated.

26. A method according to claim 25, wherein a short circuit is produced if one or each of the electric conductors moves into electric contact with the other conductor and an alarm signal is generated.

* * * * *

UNITED STATES PATENT AND TRADEMARK OFFICE
CERTIFICATE OF CORRECTION

PATENT NO. : 6,885,298 B2
DATED : April 26, 2005
INVENTOR(S) : Ted Everson et al.

It is certified that error appears in the above-identified patent and that said Letters Patent is hereby corrected as shown below:

Column 4,
Line 12, "fuel cell housing" should read as -- a fuel cell housing --.

Signed and Sealed this

Thirtieth Day of August, 2005

JON W. DUDAS
*Director of the United States Patent and Trademark Office*